United States Patent [19]

Selder

[11] 4,405,450
[45] Sep. 20, 1983

[54] METHOD FOR FRACTIONATING FIBER STOCK OBTAINED FROM WASTE PAPER AND APPARATUS FOR THE PERFORMANCE OF THE AFORESAID METHOD

[75] Inventor: Harald Selder, Schlier, Fed. Rep. of Germany

[73] Assignee: Escher Wyss GmbH, Ravensburg, Württ, Fed. Rep. of Germany

[21] Appl. No.: 300,632

[22] Filed: Sep. 9, 1981

[30] Foreign Application Priority Data

Oct. 3, 1980 [CH] Switzerland ............ 7391/80

[51] Int. Cl.³ .................. D21D 5/04; B07B 1/04; B03B 7/00
[52] U.S. Cl. ........................................ 209/3; 209/12; 209/17; 209/273; 162/4; 162/55; 241/33; 241/46.17
[58] Field of Search ............ 209/1, 3, 17, 273, 358, 209/235, 237, 233, 12; 162/4–6, 55; 241/33, 30, 35, 46.17

[56] References Cited

U.S. PATENT DOCUMENTS

| | | | |
|---|---|---|---|
| 3,964,996 | 6/1966 | Holz et al. | 209/17 |
| 4,017,033 | 4/1977 | Tra | 241/46.17 X |
| 4,042,503 | 8/1977 | Justus | 209/273 X |

FOREIGN PATENT DOCUMENTS

| | | | |
|---|---|---|---|
| 2757580 | 7/1978 | Fed. Rep. of Germany | 162/4 |
| 2759113 | 9/1978 | Fed. Rep. of Germany | 162/4 |

Primary Examiner—Ralph J. Hill
Attorney, Agent, or Firm—Werner W. Kleeman

[57] ABSTRACT

To fractionate fiber stock there is used a sieve device which can be constructed in the manner of a secondary stock pulper or fiberizer, yet contains a sieve having a hole size in a range of about 0.8 to 2.4 millimeters diameter. The fiberizer contains a rotor driven by a drive motor and equipped with arms movable around the sieve. At the side of the sieve confronting the rotor there is located a closed long fiber chamber with which merges the infeed line for a cleaned fiber stock suspension which is obtained from waste paper. At the same time a long fiber line leads out of this long fiber chamber into a long fiber vat or container. Behind the sieve there is located a short fiber chamber from which leads a short fiber line to a short fiber vat or container. In at least one of the lines there is arranged a throttle element which is actuated as a function of a signal received from a power measuring device. Actuation of the throttle element is accomplished in the sense that with increasing power consumption or requirement of the rotor the flow through the long fiber line leading from the long fiber chamber is intensified and vice versa.

11 Claims, 2 Drawing Figures

METHOD FOR FRACTIONATING FIBER STOCK OBTAINED FROM WASTE PAPER AND APPARATUS FOR THE PERFORMANCE OF THE AFORESAID METHOD

CROSS REFERENCE TO RELATED APPLICATION

This application is related to my commonly assigned, copending U.S. application Ser. No. 06/183,086, filed Sept. 2, 1980 and entitled "Method for Operating an Installation for Processing Waste Paper and Installation for the Performance of the Aforesaid Method".

BACKGROUND OF THE INVENTION

The present invention relates to a new and improved method of fractionating fiber stock reclaimed from waste paper by means of a sieve device. A cleaned or purified fiber stock suspension freed of heavy and light contaminants or rejects is infed to the sieve device. The fiber stock suspension contains longer and shorter stock fibers which are to be separated from one another.

Additionally, the invention also relates to an installation for the performance of the aforesaid method and contains a stock pulper or slusher for slushing or defiberizing the waste paper, a cleaning device arranged following the slusher and a sorting device.

It is already known in this technology that a sieve device possesses a fractionating effect or action, i.e. is capable of separating longer fibers from shorter fibers of a fiber stock suspension. The shorter fibers preferably penetrate through the sieve, whereas the longer fibers remain at the infeed side of such sieve. Consequently, an infed flow of the fiber stock suspension is divided into two streams. One of these streams effluxes out of a chamber located forwardly of the sieve, the other stream out of a chamber located after the sieve. With the heretofore known methods and apparatuses, both of these streams are however divided in a constant ratio or relationship, and specifically, this is accomplished by regulating one of the streams so as to possess a constant proportion of the infed quantity of the fiber stock suspension. However, with this technique it is not possible to maintain constant the quality of the long fiber proportion and that of the short fiber proportion if the composition of the infed waste paper fluctuates.

SUMMARY OF THE INVENTION

Therefore, with the foregoing in mind it is a primary object of the present invention to overcome the aforementioned drawbacks and limitations of the prior art equipment and methods of the character described.

Another and more specific object of the present invention aims at overcoming the disadvantages of the state-of-the-art equipment and divising a method and installation or apparatus wherein it is possible to maintain essentially constant the quality of the fibers in both of the aforementioned streams.

Now in order to implement these and still further objects of the invention, which will become more readily apparent as the description proceeds, the method of the present development is manifested by the features that there is used as the sieve device a device containing a sieve or filter located in a housing. This sieve has a hole size in the order of about 0.8 to 2.4 millimeters diameter. The sieve device contains a rotor driven by a drive motor. The rotor possesses arms which can be moved around or over the sieve. At the side of the sieve confronting the rotor there is located a closed long fiber chamber or space to which there is connected the infeed line for the fiber stock suspension and from which leads a long fiber line to a long fiber container or vat. Behind the sieve there is formed a likewise closed short fiber chamber or space from which leads a short fiber line to a short fiber container or vat. In at least one of these lines, namely the short fiber line and/or the long fiber line, there is arranged a throttle element which can be controlled as a function of the power requirement or consumption of the rotor, and specifically in a manner such that with increasing power requirement of the rotor the flow in the long fiber line leading out of the long fiber chamber is intensified and vice versa.

As mentioned above the invention is not only concerned with the aforementioned method aspects, but additionally pertains to a new and improved construction of apparatus or installation for the performance of such method. The inventive apparatus is manifested by the features that there is provided after or downstream of the sorting device a fractionating or sieve device containing a sieve located within a housing. This sieve has a hole size in the order of about 0.8 to 2.4 millimeters diameter and contains a rotor driven by a drive motor. The rotor possesses arms which are movable around or over the sieve. At the side of the sieve confronting the rotor there is arranged a closed long fiber chamber or space to which there is connected the infeed line or conduit for the fiber stock suspension and from which leads a long fiber line to a long fiber vat or container. Behind the sieve there is arranged a likewise closed short fiber chamber from which leads a short fiber line or conduit to a short fiber vat or container. In at least one of the lines, namely the short fiber line and/or the long fiber line, there is arranged a throttle element. The motor for driving the rotor is equipped with a measuring device for measuring its power output. A regulation device serves for actuating the throttle element as a function of measuring signals received from the power measuring device. The regulation device or regulator actuates the throttle element in a manner such that with increasing power consumption of the rotor the flow in the long fiber line leading out of the long fiber chamber is intensified and vice versa.

If, with the inventive equipment, the concentration of the long fibers within the long fiber chamber increases, then the viscosity of the stock suspension or liquid within such long fiber chamber increases. As a result, there is concomitantly increased the resistance to movement of the arms of the rotor, resulting in an increase in the power consumption or requirement of the rotor. This power requirement thus is indicative for the concentration of the long fibers in the stock suspension located in the long fiber chamber.

With the inventive arrangement of the throttle element and the regulator there is ensured that only so much fiber stock will be extracted out of the long fiber chamber as is required by the quantity of the infed long fibers. The remaining short fibers pass through the sieve into the short fiber chamber. Hence, there is obtained a constant quality of both fractions of the fiber stock in the presence of quantities which are dependent upon the presence of the corresponding fibers in the infed fiber stock suspension.

According to a preferred manifestation of the method the waste paper which is to be processed can be divided into at least two groups. One of these groups contains waste paper possessing longer fibers and the other group waste paper containing shorter fibers. The infeed of the waste paper from both waste paper groups to a slushing or defiberizing device arranged forwardly of the sieve device is accomplished as a function of the ratio of filling of the long fiber container and the short fiber container.

With the inventive equipment the size of the holes of the sieve preferably is in a range of 1.2 to 1.8 millimeters.

The throttle element can be located in the long fiber line or conduit and can be actuated by the regulation device, in the sense of opening such throttle element, when there prevails an increasing power consumption of the drive motor of the rotor.

However, the throttle element also can be located in the short fiber line and can be actuated by the regulation device, in the sense of closing the throttle element, when there prevails an increasing power consumption or requirement of the drive motor of the rotor.

In both instances it is possible to obtain in a most simple manner the desired control of both streams or currents of the fraction containing long fibers and short fibers. It should be readily understood that the throttle elements also can be arranged in both of these lines or conduits.

Preferably, the sorting device which is arranged forwardly of the fractionating device can be constituted by a secondary pulper or fiberizer which likewise possesses a sieve and a motor driven rotor containing arms movable around the sieve. With this known device there is not only obtained a sorting action but at the same time also a slushing or defiberizing and cleaning of the fiber stock suspension.

The fractionating device can be constructively designed similar to a secondary pulper or fiberizer and can possess a flat or planar sieve and a relatively large long fiber chamber. This has a smoothing effect upon surges which might be present with respect to the infeed of the long fiber material and therefore facilitates the control or regulation.

BRIEF DESCRIPTION OF THE DRAWINGS

The invention will be better understood and objects other than those set forth above, will become apparent when consideration is given to the following detailed description thereof. Such description makes reference to the annexed drawings wherein.

DETAILED DESCRIPTION OF THE PREFERRED EMBODIMENTS

Figure 1:
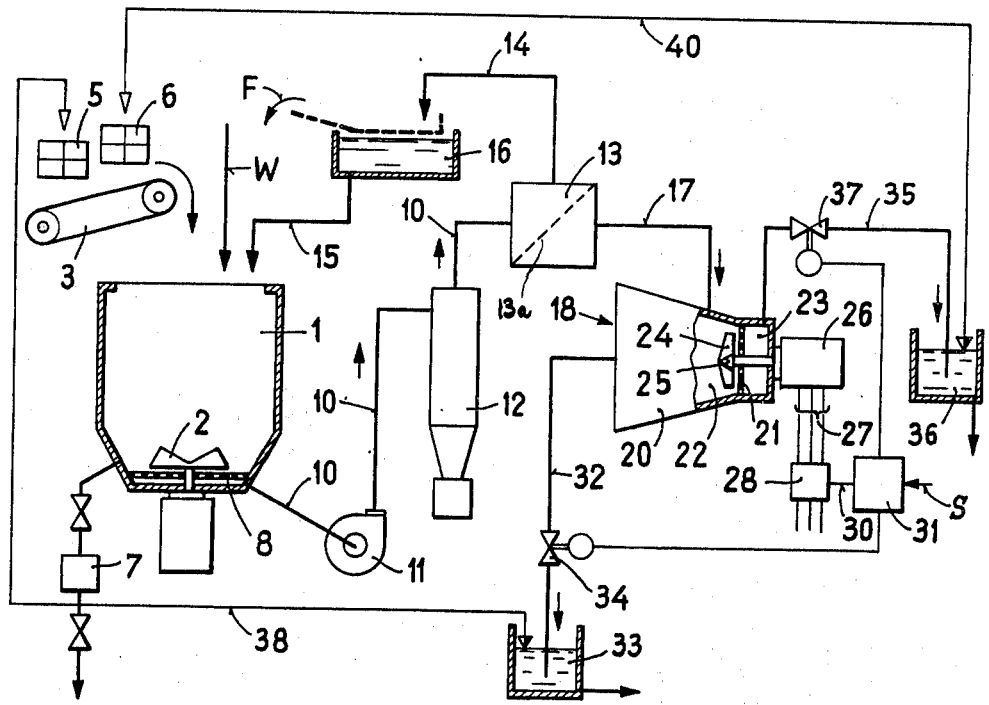
FIG. 1 is a schematic circuit diagram of an apparatus or installation constructed according to the invention.

Describing now the drawings, in the exemplary embodiment of apparatus or installation depicted in FIG. 1 there has been illustrated a stock slusher or pulper 1 which contains a motor driven rotor 2. A suitable conveyor or conveyor device 3 feeds bales 5 and 6 of waste paper into the slusher or pulper 1. The bales 5 contain more long fibers, whereas the bales 6 contain fewer long fibers and these bales 5 and 6 are representative of groups of bales of waste paper. As indicated by the arrow W there is infed to the slusher 1 the requisite quantity of water, if desired in conjunction with suitable chemicals, as is well known in the waste paper processing art.

The slusher or pulper 1 is provided in known manner with an outlet sluice 7 for heavy rejects or constituents. The stock suspension formed in the slusher 1 passes through a sieve 8 into an outlet line or conduit 10 equipped with a pump 11. Pump 11 delivers this stock suspension to a hydrocyclone 12 constituting a cleaning device. The stock suspension freed of the heavy constituents arrives from the hydrocyclone 12 at a sieve or sorting device 13. The constituents, such as plastic foils and so forth, held back by the sieve, generally indicated by reference character 13a, of the sieve device 13, arrive by means of a return flow line 14 at a dynamic jarrer or vibrator 16 or equivalent structure where there are separated out the foil pieces, as has been indicated by arrow F. Useful fiber material arrives through an extension or continuing line 15 of the return flow line 14 back into the stock slusher or pulper 1.

Leading from the good stock side of the sieve device 13 is an outlet line or conduit 17 for the material which has passed through the sieve 13a of the sieve device 13. The outlet or outflow line 17 leads to a fractionating device 18 which may be constructed in the form of a secondary pulper or fiberizer, for instance as taught in U.S. Pat. No. 3,942,728, granted Mar. 9, 1976 and the corresponding German Pat. No. 2,345,735.

As will be readily evident by reverting to FIG. 1, the fractionating device 18 contains a housing 20 having the form of a body of rotation. Within the housing 20 there is arranged a flat or planar sieve plate 21 which divides the housing 20 into a long fiber chamber or space 22 and a short fiber chamber or space 23. The long fiber chamber 22 is relatively large in size and is appreciably greater in size than the short fiber chamber 23. Movable along the sieve 21 are arms 24 of a rotor 25 which can be driven by any suitable drive motor 26. Connected with the electrical lines 27 leading to the drive motor 26 is a power measuring or metering device 28 or equivalent structure which delivers its measuring signals by means of a signal line 30 to a regulation device or regulator 31.

Leading out of the long fiber chamber 22 of the fractionating device 18 is a long fiber line or conduit 32 to a long fiber vat or container 33. Located in the long fiber line 32 is a throttle element 34 which is actuated by the regulator 31.

Leading out of the short fiber chamber 23 is a short fiber line 35 to a short fiber vat or container 36. The short fiber line 35 is equipped with a throttle element 37 which likewise can be controlled by the regulator 31.

Additionally, as will be seen by referring to FIG. 1 and as has been indicated by the signal lines 38 and 40, the loading or charging of the conveyor device 3 can be accomplished as a function of the level of the stock suspension in the long fiber container or vat 33 and the short fiber container or vat 36, respectively. In this instance the bales 5 and 6 of waste paper must be divided such that the bales 5 contain paper material containing long fibers and the bales 6 paper material containing short fibers.

At this point reference will be made to the modified embodiment of FIG. 2 which differs from the described embodiment of FIG. 1 essentially only in that here there is used as a sieve device 13 a conventional secondary pulper or fiberizer 13' which can be designed in accordance with the teachings of the aforementioned U.S. Pat. No. 3,942,728 and the corresponding German Pat.

No. 2,345,735, the disclosure of which is incorporated herein by reference. The hole size or perforations of the sieve of the secondary pulper or fiberizer 13' can be selected in conventional manner and possess, for instance, a diameter of 4 to 6 millimeters, in other words can be appreciably larger in size than that of the sieve 21 which, as already explained, has a hole size in the order of 0.8 to 2.4 millimeters diameter, preferably 1.2 to 1.8 millimeters.

Figure 2:
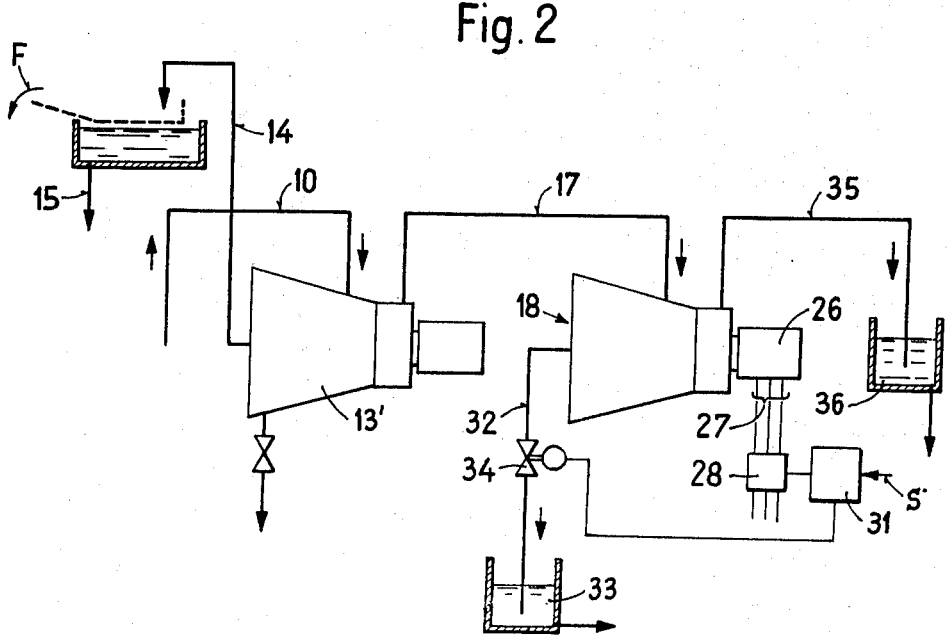
FIG. 2 is a detail of the arrangement of FIG. 1, but illustrating a preferred construction of the apparatus.

Additionally, in the arrangement of FIG. 2 there has been omitted the throttle element 37 located in the line or conduit 35, so that the regulator 31 only actuates the throttle element 34 located in the long fiber line or conduit 32.

During operation the bales 5 and 6 of waste paper are slushed or defiberized in known manner in water within the stock slusher 1. The obtained fiber stock suspension is cleaned of heavy contaminants or rejects in likewise known manner within the hydrocyclone 12 which is representative for an entire battery or series of such units, and in the sieve device 13 such fiber stock suspension is cleaned from the light surface-like or areal contaminants or rejects. The thus obtained cleaned stock suspension arrives by means of the line or conduit 17 at the fractionating or sieve device 18 where a part thereof, composed of short fibers, passes through the sieve plate 21 into the short fiber chamber 23 and effluxes therefrom through the short fiber line 35 into the short fiber vat or container 36. The longer fibers, which have not passed through the sieve or sieve plate 21, accumulate in the long fiber chamber 22, with the result that the viscosity of the suspension located in the long fiber chamber 22 increases. The leads to an increase in the rotational resistance at the rotor 25, resulting in an increase of the power or output delivered by the drive motor 26. This is detected by the measuring device 28 and transmitted in the form of a suitable signal through the line or conductor 30 to the regulator 31. This regulator 31 then compares the signal received from the line 30 with a predetermined set or reference value signal S which has been inputted to such regulator 31 and correspondingly adjusts the throttle element 34 in the long fiber line 32 and the throttle element 37 in the short fiber line 35. Hence, the throttle element 34 is actuated in a sense such that with an increase in the rotational resistance, i.e. an accumulation of long fibers in the long fiber chamber 22, there is further increased or freed the flow through the long fiber line 32. The throttle element 37 in the short fiber line 35 is actuated in the converse sense. With an increase of the viscosity of the fiber suspension in the long fiber chamber 32 there is throttled the flow through the short fiber line 35, in order to thus augment the outflow through the long fiber line or conduit 32.

It should be understood that although in FIG. 1 there have been depicted both throttle elements 34 and 37, a single one of these throttle elements is adequate for satisfactory operation of the equipment.

By means of the inventive apparatus or installation, operating in accordance with the inventive method, the flow of the fiber stock suspension which is infed to the fractionating device 18 is divided into two flows or streams possessing two different qualities, and specifically a flow or stream through the line 32 into the long fiber container or vat 33 and a flow or stream through the line 35 into the short fiber vat or container 36. The size of both of these streams only is dependent upon the presence of the corresponding type of fibers in the stock suspension which is infed through the line 17. Consequently, there can be collected in the containers 33 and 36 quite different quantities of fibers in their suspension. This can be taken into account in that as a function of such accumulation of the different quantities of fiber materials there can be controlled the infeed of the bales 5 and 6 of the different groups of waste paper.

With the embodiment of FIG. 2 the secondary pulper or fiberizer 13', in contrast to the sieve device 13 of the arrangement of FIG. 1, has in addition to its sorting action also the task of more finely defiberizing or slushing the infed stock suspension. The rotor of such fiberizer 13' which is present in this fiberizer 13', like in the device 18, thus has the combined task of forming a vortex field for eliminating heavy and light rejects or contaminants, defiberizing of not yet completely defiberized paper parts, such as rags, lumps, speckled or mottled portions and so forth, and maintaining unclogged the sieve plate.

On the other hand, with the inventive fractionating device 18 the rotor 25, apart from performing the task of maintaining unclogged the sieve 21, has as its most important assignment measuring the viscosity of the stock suspension in the long fiber chamber 22.

The already mentioned relatively large volume of the long fiber chamber 22 is assigned the function of compensating briefly arising surges in the infeed of the long fiber material, and thus having a smoothing or stabilizing effect upon the operation of the regulator 31.

While there are shown and described present preferred embodiments of the invention, it is to be distinctly understood that the invention is not limited thereto, but may be otherwise variously embodied and practiced within the scope of the following claims. Accordingly,

What I claim is:

1. A method of fractionating fiber stock obtained from waste paper by means of a sieve device to which there is infed a cleaned fiber stock suspension freed of heavy and light contaminants and which contains longer and shorter stock fibers which are to be separated from one another, comprising the steps of:

utilizing as the sieve device a structure containing a housing with a sieve arranged therein having a size of its sieve holes in the order of 0.8 to 2.4 millimeters diameter;

providing the sieve device with a rotor driven by a drive motor and with said rotor containing arms;

moving said arms along the sieve;

providing a long fiber chamber at the side of the sieve confronting the rotor;

connecting an infeed line for the fiber stock suspension so as to flow communicate with said long fiber chamber;

directing a long fiber line out of the long fiber chamber into operative communication with a long fiber container;

forming behind the sieve a short fiber chamber;

leading a short fiber line out of the short fiber chamber into a short fiber container;

providing a throttle element in at least one of said lines; and controlling said throttle element as a function of the viscosity of the fiber stock suspension located forwardly of the sieve and within the long fiber chamber and thus the power consumption of the rotor in a manner such that with increasing viscosity and increasing power consumption of the rotor the flow in the long fiber line leading from the long fiber chamber is intensified and with decreasing viscosity and decreasing power consumption of the rotor the flow in the long fiber line leading from the long fiber chamber is diminished.

2. The method as defined in claim 1, further including the steps of:
dividing the waste paper which is to be processed into at least two groups;
one of said groups containing waste paper having long fibers and the other group containing waste paper having short fibers; and
accomplishing the infeed of the waste paper from both of the groups into a slusher arranged upstream of the sieve device as a function of the ratio of filling of the long fiber container and the short fiber container.

3. An apparatus for fractionating fiber stock obtained from waste paper, comprising:
a stock slusher for slushing waste paper;
a cleaning device arranged after the stock slusher and cooperating with said stock slusher;
a sorting device arranged after the cleaning device and cooperating with said cleaning device;
a fractionating device arranged following said sorting device and cooperating with said sorting device;
said fractionating device comprising a housing;
a sieve arranged in said housing;
said sieve having sieve holes in the order of approximately 0.8 to 2.4 millimeters diameter;
a rotor provided with arm means arranged within said housing;
a drive motor for driving said rotor such that said arm means are movable around said sieve;
a closed long fiber chamber arranged at a side of said sieve confronting said rotor;
an infeed line for fiber stock suspension operatively connected with said closed long fiber chamber;
a long fiber container;
a long fiber line leading from said closed long fiber chamber to said long fiber container;
a short fiber chamber arranged within said housing behind said sieve;
a short fiber container;
a short fiber line leading from said short fiber chamber to said short fiber container;
a throttle element provided for at least one of said lines;
a measuring device for measuring the power output of the drive motor in response to changes in viscosity of the fiber stock suspension located in said closed long fiber chamber and serving for driving said rotor; and
a regulator cooperating with said power output measuring device for actuating the throttle element as a function of measuring signals delivered by the power output measuring device in a manner such that the throttle element is actuated so that with increasing viscosity of the fiber stock suspension in the closed long fiber chamber and with increasing power consumption of the rotor the flow in the long fiber line leading out of the closed long fiber chamber is intensified and with decreasing viscosity of the fiber stock suspension in the closed long fiber chamber and with decreasing power consumption of the rotor the flow in the long fiber line leading out of the closed long fiber chamber is diminished.

4. The apparatus as defined in claim 3, wherein:
the sieve holes of the sieve have a hole diameter in a range of 1.2 to 1.8 millimeters.

5. The apparatus as defined in claim 3 or 4, wherein:
said throttle element is arranged in the long fiber line; and
said regulator actuating said throttle element so as to open the same in the presence of an increasing power consumption of the drive motor of the rotor.

6. The apparatus as defined in claim 3 or 4, wherein:
said throttle element is located in the short fiber line; and
said regulator actuating said throttle element in a manner such that it is closed in the presence of increasing power consumption of the drive motor of the rotor.

7. The apparatus as defined in claim 4, wherein:
said sorting device is arranged upstream of said fractionating device and is constructed as a fiberizer;
said fiberizer containing a sieve; and
said fiberizer further containing a motor driven rotor having arm means movable around said sieve.

8. The apparatus as defined in claim 4, wherein:
said fractionating device is structured as a fiberizer; and
said fiberizer containing a substantially flat sieve and a relatively large long fiber chamber.

9. The apparatus as defined in claim 3, wherein:
said closed long fiber chamber possesses a volume sufficient to compensate for briefly arising surges in the infeed of long fiber material contained in the fiber stock suspension delivered to said closed long fiber chamber.

10. The apparatus as defined in claim 3, wherein:
the fiber stock suspension treated in said fractionating device is essentially devoid of rejects.

11. An appratus for fractionating fiber stock obtained from waste paper, comprising:
a fractionating device for receiving a fiber stock suspension containing long fibers and short fibers and for classifying said long and short fibers into separate fiber fractions;
said fractionating device comprising a housing;
a sieve arranged in said housing;
said sieve having sieve holes in the order of approximately 0.8 to 2.4 millimeters diameter;
a rotor provided with arm means arranged within said housing;
a drive motor for driving said rotor such that said arm means are movable around said sieve;
a long fiber chamber arranged at a side of said sieve confronting said rotor;
an infeed line for fiber stock suspension operatively connected with said long fiber chamber;
a long fiber container;
a long fiber line leading from said long fiber chamber to said long fiber container;
a short fiber chamber arranged within said housing behind said sieve;
a short fiber container;
a short fiber line leading from said short fiber chamber to said short fiber container;
a throttle element provided for at least one of said lines;
a measuring device for measuring the power output of the drive motor in response to changes in viscosity of the fiber stock suspension located in said long fiber chamber and serving for driving said rotor; and a regulator cooperating with said power output measuring device for actuating the throttle element as a function of measuring signals delivered by the power output measuring device in a manner such that the throttle element is actuated so that with increasing viscosity of the fiber stock suspension in the long fiber chamber and with increasing power consumption of the rotor the flow in the long fiber line leading out of the long fiber chamber is intensified and with decreasing viscosity of the fiber stock suspension in the long fiber chamber and with decreasing power consumption of the rotor the flow in the long fiber line leading out of the long fiber chamber is diminished.

* * * * *